(12) United States Patent
Sugiyama

(10) Patent No.: US 11,435,594 B2
(45) Date of Patent: Sep. 6, 2022

(54) METHOD FOR ADJUSTING OPTICAL SOURCE

(71) Applicant: Sumitomo Electric Device Innovations, Inc., Yokohama (JP)

(72) Inventor: Makoto Sugiyama, Yokohama (JP)

(73) Assignee: SUMITOMO ELECTRIC DEVICE INNOVATIONS, INC., Kanagawa (JP)

(*) Notice: Subject to any disclaimer, the term of this patent is extended or adjusted under 35 U.S.C. 154(b) by 553 days.

(21) Appl. No.: 16/508,351

(22) Filed: Jul. 11, 2019

(65) Prior Publication Data
US 2020/0018984 A1 Jan. 16, 2020

(30) Foreign Application Priority Data

Jul. 13, 2018 (JP) .............................. JP2018-133451

(51) Int. Cl.
| | |
|---|---|
| *G02B 27/28* | (2006.01) |
| *G02B 6/122* | (2006.01) |
| *H04B 10/61* | (2013.01) |
| *G02B 6/28* | (2006.01) |
| *G02B 6/27* | (2006.01) |
| *H04B 10/50* | (2013.01) |
| *G02B 27/09* | (2006.01) |

(Continued)

(52) U.S. Cl.
CPC ........... *G02B 27/283* (2013.01); *G02B 6/122* (2013.01); *G02B 6/2773* (2013.01); *G02B 6/2817* (2013.01); *H04B 10/61* (2013.01); *G02B 6/2706* (2013.01); *G02B 6/3897* (2013.01); *G02B 6/4214* (2013.01); *G02B 27/0955* (2013.01); *H04B 10/50* (2013.01)

(58) Field of Classification Search
None
See application file for complete search history.

(56) References Cited

U.S. PATENT DOCUMENTS

| | | | |
|---|---|---|---|
| 6,310,679 B1* | 10/2001 | Shiraishi | ............. G03F 7/70058 355/53 |
| 6,434,176 B1* | 8/2002 | Deck | ..................... H01S 3/1396 372/32 |

(Continued)

FOREIGN PATENT DOCUMENTS

JP        H5-158096        6/1993

*Primary Examiner* — Jerry Rahll
(74) *Attorney, Agent, or Firm* — Smith, Gambrell & Russell, LLP.

(57) ABSTRACT

A method for adjusting an optical source used for fabricating an optical receiver comprising a signal beam input port, a polarization beam splitter, and signal generation units, is disclosed. The optical source generates a reference beam by combining first and second beams having polarization directions orthogonal each other. The reference beam is introduced to the signal beam input port to measure a first size of an electric signal generated in one of the signal generation units. A half-wavelength plate is disposed in an optical path between the beam splitter and the one of the signal generation units. After that, the reference beam is introduced to the signal beam input port to measure a second size of an electric signal generated in the one of the generation units. At least one of the first and second beams is adjusted such that the first size and the second size become close to each other.

2 Claims, 11 Drawing Sheets

(51) Int. Cl.
*G02B 6/38* (2006.01)
*G02B 6/42* (2006.01)

(56) References Cited

U.S. PATENT DOCUMENTS

| | | | |
|---|---|---|---|
| 6,882,477 B1* | 4/2005 | Schattenburg | G03F 7/70408 |
| | | | 359/35 |
| 2002/0044576 A1* | 4/2002 | Yanagawa | G11B 7/1365 |
| | | | 372/29.014 |
| 2005/0141067 A1* | 6/2005 | Ogasawa | G11B 7/24044 |
| 2014/0362880 A1* | 12/2014 | Chuang | H01S 3/0092 |
| | | | 372/22 |
| 2019/0214786 A1* | 7/2019 | Whitmore | H01S 5/4031 |

* cited by examiner

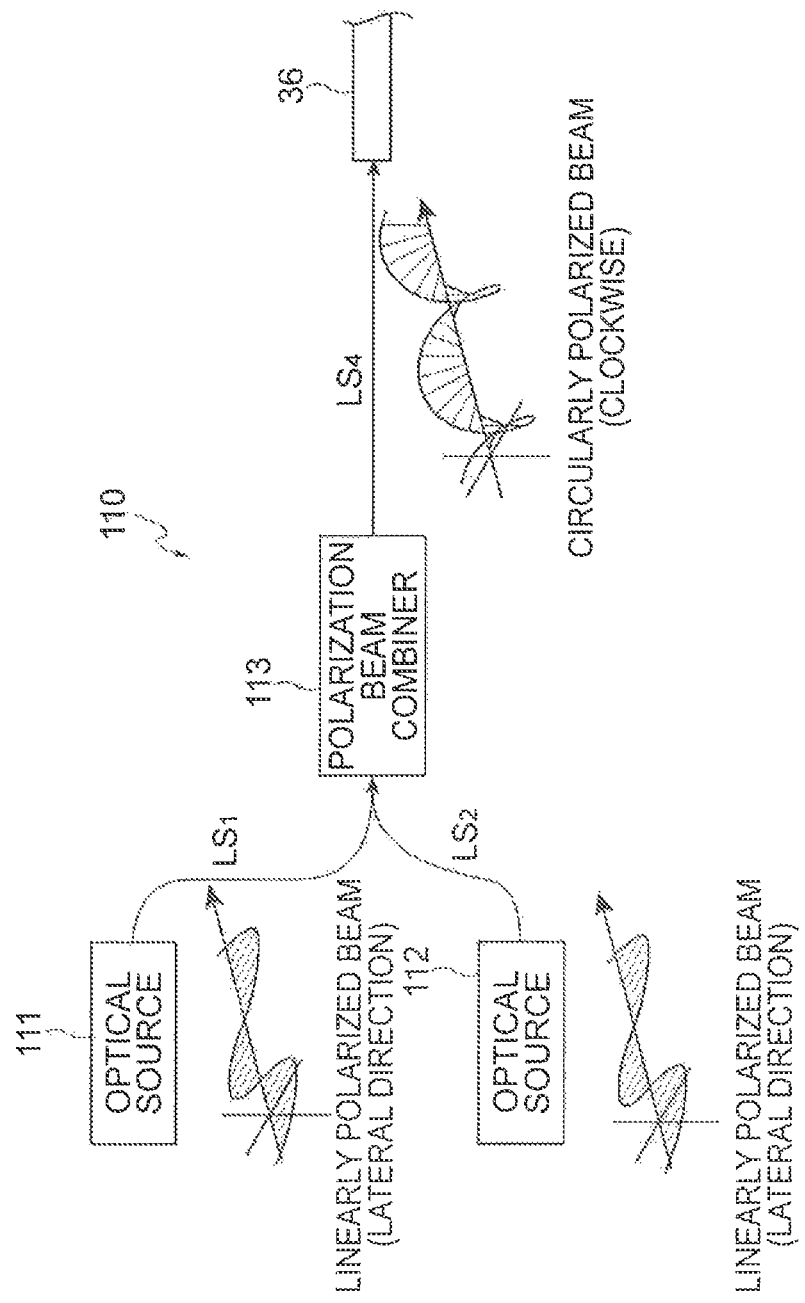

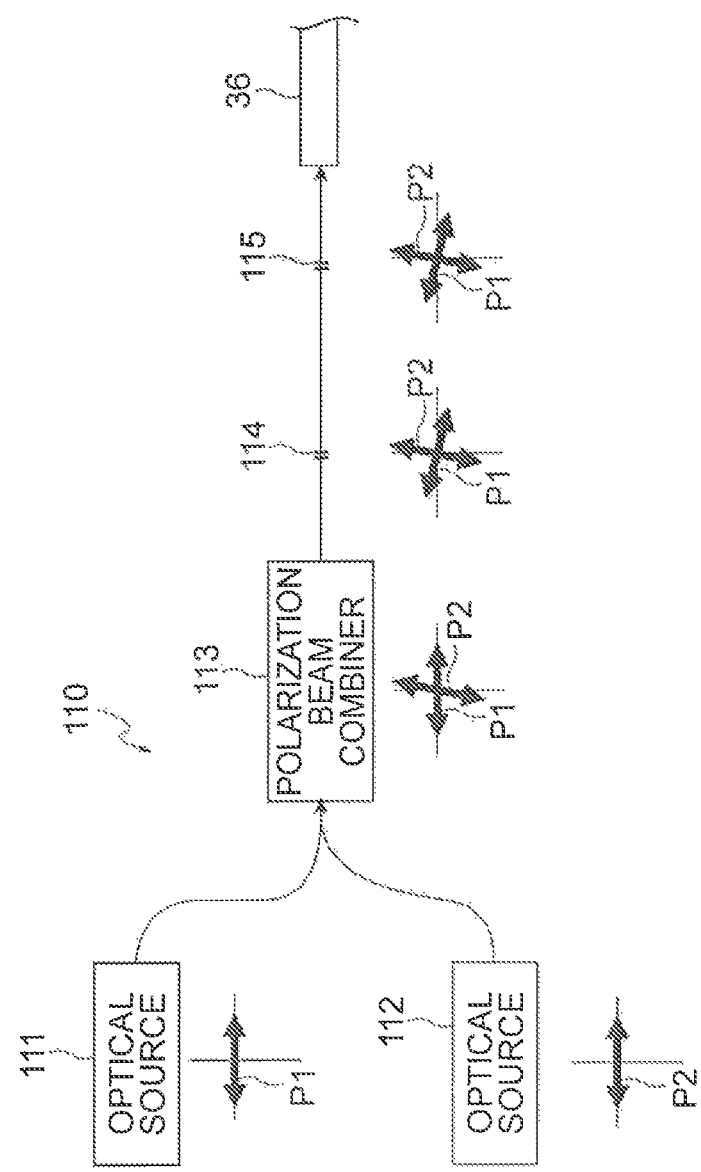

METHOD FOR ADJUSTING OPTICAL SOURCE

CROSS REFERENCE TO RELATED APPLICATION

The present application is based upon and claims the benefit of the priority from Japanese patent application No. 2018-133451, filed on Jul. 13, 2018, the entire contents of which are incorporated herein by reference.

TECHNICAL FIELD

The present disclosure relates to a method for adjusting an optical source.

BACKGROUND

JP H5-158096 A discloses a coherent optical receiver. Optical signals of multiplexed polarization waves and phases are inputted into an optical receiver such as a coherent communications optical receiver via a polarization maintaining fiber. The optical receiver splits the optical signals according to polarization by a polarization beam splitter (PBS). The split optical signals are separated according to phase by a 90-degree optical hybrid mixer. The separated optical signals are converted into electric signals by a light receiving element.

SUMMARY

The present disclosure provides a method for adjusting an optical source used for fabricating an optical receiver. The optical receiver comprises a signal beam input port that receives a signal beam including two polarization components having polarization directions orthogonal to each other; a polarization beam splitter that splits the signal beam into the two polarization components; and two signal generation units that generate electric signals based on each of the two polarization components passed through the polarization beam splitter. The optical source generates a reference beam by combining a first beam and a second beam having polarization directions orthogonal to each other. The method comprises the steps of introducing the reference beam to the signal beam input port and measuring a first size of an electric signal generated in one of the signal generation units; disposing a half-wavelength plate in an optical path between the polarization beam splitter and the one of the signal generation units; introducing the reference beam to the signal beam input port and measuring a second size of an electric signal generated in the one of the signal beam generation units after disposing the half-wavelength plate on the optical path; and adjusting at least one of the first beam and the second beam such that the first size and the second size become close to each other.

The present disclosure provides another method for adjusting an optical source used for fabricating an optical receiver. The optical receiver comprises a signal beam input port that receives a signal beam including two polarization components having polarization directions orthogonal to each other; a polarization beam splitter that splits the signal beam into the two polarization components; and two signal generation units that generates electric signals based on each of the two polarization components passed through the polarization beam splitter. The optical source generates a reference beam by combining a first beam and a second beam having polarization directions orthogonal to each other. The method comprises the steps of introducing a reference beam to the signal beam input port and measuring a first size of an electric signal generated in one of the signal generation units; disposing a polarization rotation component rotating a polarization angle by 90 degrees on an optical path between the signal beam input port and the polarization beam splitter, introducing the reference beam to the signal beam input port and measuring a second size of an electric signal generated in the one of the signal beam generation units after disposing the polarization rotation component on the optical path; and adjusting at least one of the first beam and the second beam such that the first size and the second size become close to each other.

BRIEF DESCRIPTION OF THE DRAWINGS

The foregoing and other purposes, aspects and advantages will be better understood from the following detailed description of an embodiment of the disclosure with reference to the drawings, in which:

FIG. 5 is a diagram for describing a first reference optical source in detail;

FIG. 7 is a diagram for describing a reason why adjustment of the first reference optical source is performed;

DETAILED DESCRIPTION

Figure 11:
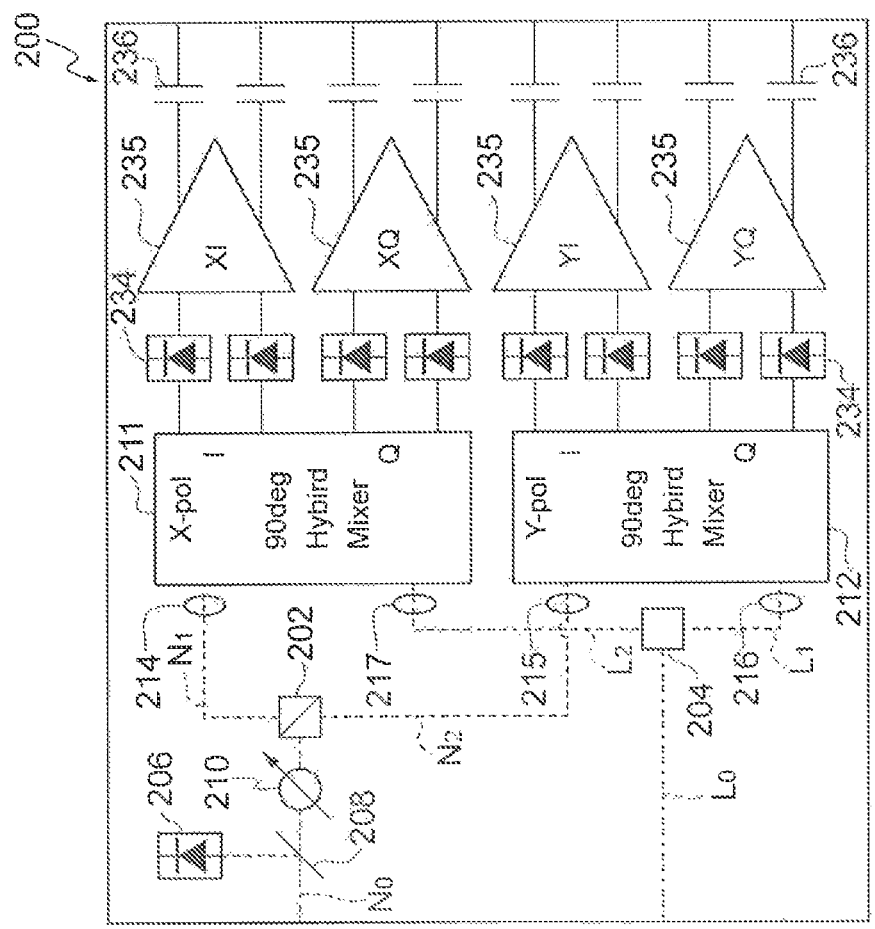
FIG. 11 is a view schematically illustrating a configuration of one example of a coherent optical receiver.

FIG. 11 is a view schematically illustrating a configuration of a coherent optical receiver 200. The coherent optical receiver 200 illustrated in FIG. 11 includes a polarization beam splitter 202, a beam splitter 204, a monitor light receiving element 206, two multi-mode interferometers (90-degree optical hybrid mixers) 211, 212, four condensing lenses 214 to 217, eight (four pairs of) signal beam receiving elements 234, four amplifiers 235, and eight (four pairs of) coupling capacitors 236.

To the coherent optical receiver 200, inputted are a signal beam $N_0$ including two polarization components having polarization directions orthogonal to each other and a local beam $L_0$ of linear polarization. A part of the signal beam $N_0$ is branched by a beam splitter 208 and inputted to the monitor light receiving element 206. The monitor light receiving element 206 detects an average light intensity of the signal beam $N_0$. The remaining part of the signal beam $N_0$ reaches the polarization beam splitter 202 via a variable attenuator 210, and is branched into a signal beam $N_1$ and another signal beam $N_2$ by the polarization beam splitter 202. The signal beam $N_1$ is inputted to the multi-mode interferometer 211 while being condensed by the condensing lens 214, and the other signal beam $N_2$ is inputted to the other multi-mode interferometer 212 while being condensed by the condensing lens 215. At this time, the polarization direction of one of the signal beam $N_1$ and the signal beam $N_2$ is rotated by 90 degrees before being inputted to the multi-mode interferometer 211 (or 212).

The local beam $L_0$ is branched by the beam splitter 204. One of branched local beams, $L_1$, is inputted to the multi-mode interferometer 212 while being condensed by the condensing lens 216, and another branched local beam $L_2$ is inputted to the other multi-mode interferometer 211 while being condensed by the condensing lens 217. The multi-mode interferometer 211 has the local beam $L_2$ interfere with the signal beam $N_1$ to output two pairs of coherent beam each exhibiting an XI signal component and an XQ signal component. The multi-mode interferometer 212 has the local beam $L_1$ interfere with the signal beam $N_2$ to output two pairs of coherent beam each exhibiting a YI signal component and a YQ signal component. The coherent beam is converted into current signals by each of the signal beam receiving elements 234. The current signals outputted from each of the signal beam receiving elements 234 are outputted to outside via the coupling capacitors 236 after being converted into differential voltage signals by the amplifiers 235.

When fabricating the coherent optical receiver 200 with such configuration, it is necessary to fix various kinds of optical components such as the condensing lenses 214 to 217 at positions and angles implementing the highest optical coupling efficiency. Therefore, for example, a reference beam to be a substitute for the signal beam $N_0$ and the local beam $L_0$ is introduced into the coherent optical receiver 200, an optical component is disposed on the optical path of the reference beam, and the position and the angle of the optical component are adjusted such that a voltage signal acquired from the amplifier 235 becomes the maximum. In that case, the reference beam to be the substitute for the signal beam $N_0$ passes through the polarization beam splitter 202, so that it is necessary to adjust the polarization direction of the reference beam. That is, the polarization direction of the reference beam is adjusted to be the same as the polarization direction of the signal beam $N_1$ when the optical component is disposed between the polarization beam splitter 202 and the multi-mode interferometer 211, while the polarization direction of the reference beam is adjusted to be the same as the polarization direction of the signal beam $N_2$ when the optical component is disposed between the polarization beam splitter 202 and the multi-mode interferometer 212.

With such method, however, it is necessary to adjust the polarization direction of the reference beam every time the optical component is disposed, thereby complicating the fabricating work and extending the work time. There is considered a method using, as the reference beam, light acquired by synthesizing two beams having polarization directions orthogonal to each other. The use of such reference beam makes it unnecessary to adjust the polarization direction of the reference beam every time the optical component is disposed, so that complication of the fabricating work can be reduced. However, the relative angle of the polarization directions of the two polarization components included in the reference beam may be shifted from 90 degrees in some cases due to a relative angle error generated at the time of synthesizing the two beams. In addition, there may be an error generated in the relative angle about the optical axis between the polarization beam splitter and the polarization direction of the reference beam due to an attachment error of an optical connector between a reference optical source and the coherent optical receiver. Such phenomena cause an intensity difference between the two beams outputted from the polarization beam splitter. As a result, accuracy of the positions and the angles of the optical components may become different from each other for the signal beam $N_1$ and the signal beam $N_2$, so that reception accuracy may vary for each polarization component.

According to the present disclosure, it is possible to assemble the optical receiver easily and accurately.

Contents of the embodiments of the present disclosure will be described. One embodiment of the present disclosure relates to a method for adjusting an optical source used for fabricating an optical receiver. The optical receiver comprises a signal beam input port that receives a signal beam including two polarization components having polarization directions orthogonal to each other; a polarization beam splitter that splits the signal beam into the two polarization components; and two signal generation units that generate electric signals based on each of the two polarization components passed through the polarization beam splitter. The optical source generates a reference beam by combining a first beam and a second beam having polarization directions orthogonal to each other. The method comprises the steps of introducing the reference beam to the signal beam input port and measuring a first size of an electric signal generated in one of the signal generation units; disposing a half-wavelength plate in an optical path between the polarization beam splitter and the one of the signal generation units; introducing the reference beam to the signal beam input port and measuring a second size of an electric signal generated in the one of the signal beam generation units after disposing the half-wavelength plate on the optical path; and adjusting at least one of the first beam and the second beam such that the first size and the second size become close to each other.

Another embodiment of the present disclosure relates a method for adjusting an optical source used for fabricating an optical receiver. The optical receiver comprises a signal beam input port that receives a signal beam including two polarization components having polarization directions orthogonal to each other; a polarization beam splitter that splits the signal beam into the two polarization components; and two signal generation units that generates electric signals based on each of the two polarization components passed through the polarization beam splitter. The optical source generates a reference beam by combining a first beam and a second beam having polarization directions orthogonal to each other. The method comprises the steps of introducing a reference beam to the signal beam input port and measuring a first size of an electric signal generated in one of the signal generation units; disposing a polarization rotation component rotating a polarization angle by 90 degrees on an optical path between the signal beam input port and the polarization beam splitter, introducing the reference beam to the signal beam input port and measuring a second size of an electric signal generated in the one of the signal beam generation units after disposing the polarization rotation component on the optical path; and adjusting at least one of the first beam and the second beam such that the first size and the second size become close to each other.

In each of the methods for each adjusting an optical source described above, the reference beam is introduced into the signal beam input port, and the first size of the electric signal generated in the one of the signal generation units is measured. At this time, one of the polarization components branched by the polarization beam splitter reaches the one of the signal generation units. Then, the half-wavelength plate (or a polarization rotation component for rotating the polarization angle by 90 degrees) is disposed in the optical path between the signal beam input port and the polarization beam splitter. Thereby, the polarization direction of the reference beam is rotated roughly by 90 degrees, so that the other polarization component orthogonal to the one polarization component reaches the one of the signal generation units instead of the one polarization component. After that, the second size of the electric signal generated in the one signal generation unit is measured. Then, at least one of the first beam and the second beam is adjusted such that the first size and the second size of the electric signals become closer to each other. This makes it possible to extremely decrease the intensity difference between each of the polarization components generated by branching the reference beam by the polarization beam splitter, so that assembling of the optical components of the optical receiver can be done with fine accuracy.

Examples of the method for adjusting an optical source used for fabricating an optical receiver according to the embodiments of the present disclosure will be described by referring to the accompanying drawings. Note that the present invention is not limited to those examples or embodiments, but illustrated in the scope of the appended claims and intended to include all changes and modifications without departing from the spirit and scope of the appended claims and equivalents thereof. In the description hereinafter, same reference numerals are applied to the same elements in the description of the drawings and duplicated descriptions thereof are omitted.

Figure 1:
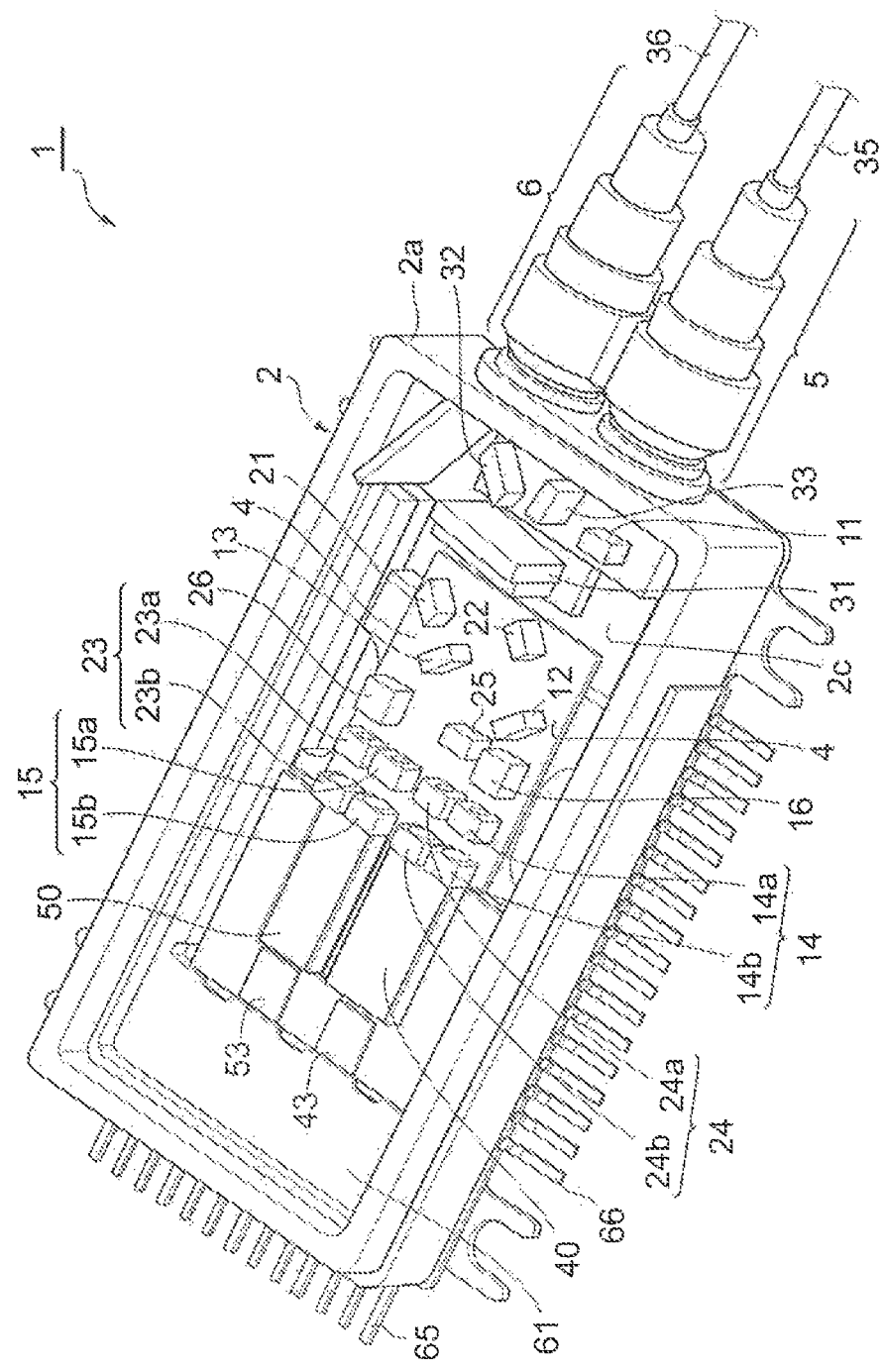
FIG. 1 is a perspective view illustrating an inside configuration of one example of a coherent receiver.
Figure 2:
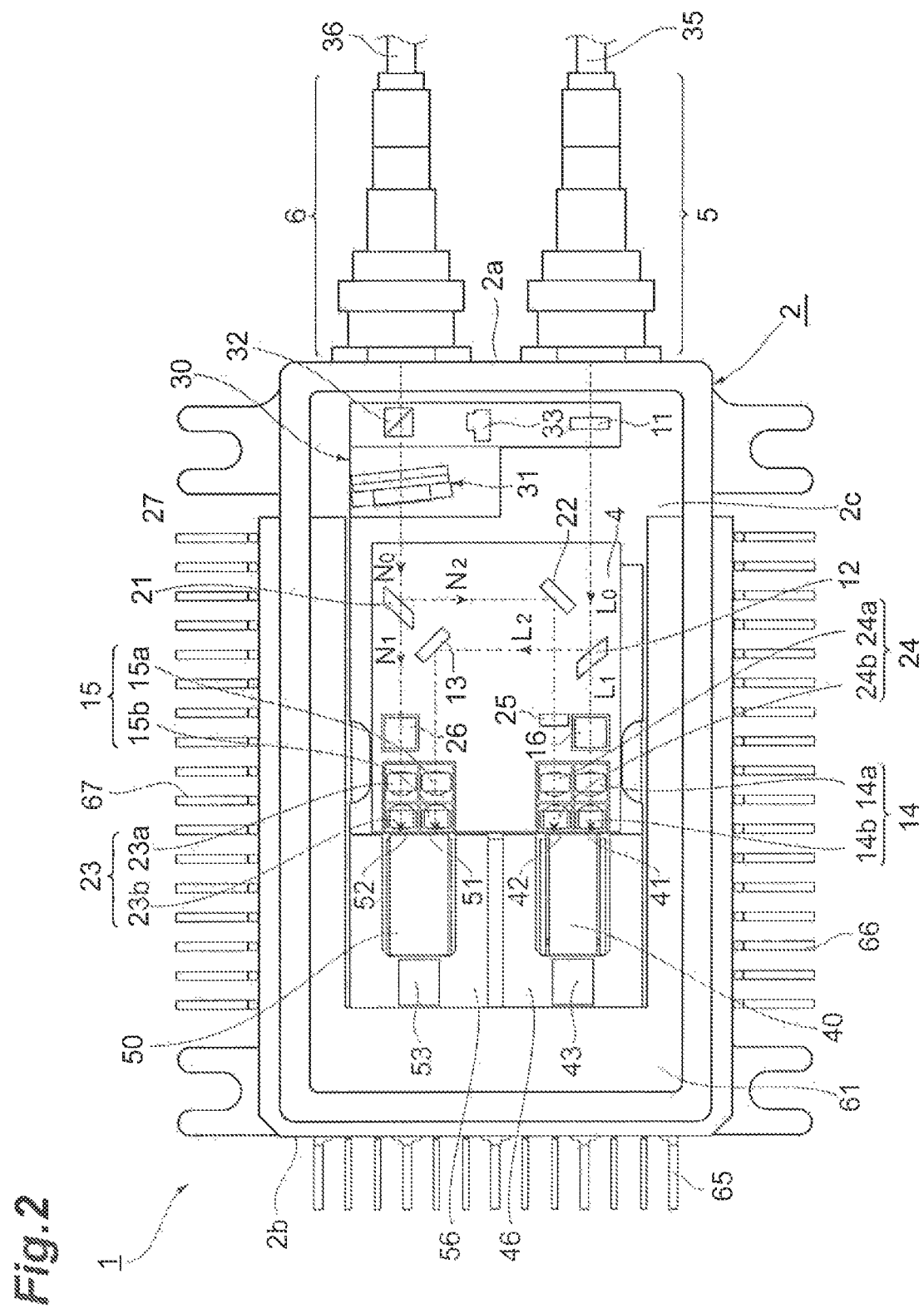
FIG. 2 is a plan view of the coherent receiver illustrated in FIG. 1.

FIG. 1 is a perspective view illustrating an inside configuration of a coherent receiver 1. FIG. 2 is a plan view of the coherent receiver 1 illustrated in FIG. 1. The coherent receiver 1 is a device that has a local beam interfere with a signal beam to demodulate information included in the phase-modulated signal beam. The demodulated information is converted into electric signals and outputted to outside the coherent receiver 1. The coherent receiver 1 includes respective optical systems for the local beams and the signal beams, and two multi-mode interference (MMI) devices 40, 50. The coherent receiver 1 includes a housing 2 that accommodate those optical systems and the MMI devices 40, 50 therein. The optical systems and the MMI devices 40, 50 are mounted on a bottom surface 2c of the housing 2 via a base 4. The base 4 is formed with an insulation material such as aluminum ($Al_2O_3$) or aluminum nitride (AlN). Circuit boards 46 and 56, which mount circuits for processing the demodulated information thereon, are mounted on the bottom surface 2c.

Each of the two MMI devices 40 and 50 is an example of the signal generation unit according to the embodiment. The two MMI devices 40 and 50 are semiconductor MMI devices, and made of InP, for example. The MMI device 40 includes a local beam introduction port 41 and a signal beam introduction port 42, and has the local beam inputted to the local beam introduction port 41 interfere with the signal beam inputted to the signal beam introduction port 42 to demodulate the phase information of the signal beam. Similarly, the MMI device 50 includes a local beam introduction port 51 and a signal beam introduction port 52, and has the local beam inputted to the local beam introduction port 51 interfere with the signal beam inputted to the signal beam introduction port 52 to demodulate the phase information of the signal beam. While the two MMI devices 40 and 50 are provided independently from each other in the embodiment, those may be integrated as one body.

The housing 2 includes a front wall 2a. In the description hereinafter, the front wall 2a side is referred to as a front side, and the opposite side is referred to as a rear side. However, it is to be noted that these "front side" and "rear side" are defined simply for the description, and not intended to limit the scope of the present invention. At the front wall 2a, a local beam input port 5 and a signal beam input port 6 are fixed by laser welding, for example. The local beam $L_0$ is provided to the local beam input port 5 via a polarization maintaining fiber 35, and the signal beam $N_0$ is provided to the signal beam input port 6 via a single-mode fiber 36. Each of the input ports 5 and 6 includes a collimator lens, and guides the local beam $L_0$ and the signal beam $N_0$ (scattered beams in a state when emitted from the respective fibers) emitted from the polarization maintaining fiber 35 and the single-mode fiber 36 into the housing 2 by converting each of those beams into collimated beams.

The local beam optical system guides the local beam provided from the local beam input port 5 to the local beam input ports 41, 51 of the MMI devices 40, 50. Specifically, the local beam optical system includes a polarizer 11, a beam splitter (BS) 12, a reflector 13, two lens groups 14, 15, and a skew adjustment element 16. The skew adjustment element 16 may be omitted if unnecessary.

The polarizer 11 is optically coupled to the local beam input port 5, and adjusts the polarization direction of the local beam $L_0$ provided from the local beam input port 5. The optical source of the local beam $L_0$ outputs an extremely flat elliptically polarized beam. Even when the optical source of the local beam $L_0$ outputs a linearly polarized beam, the local beam $L_0$ inputted from the local beam input port 5 does not include the linearly polarized beam along a prescribed direction due to mounting accuracy and the like of the optical components inserted on the optical path from the optical source to the coherent receiver 1. The polarizer 11 converts the local beam $L_0$ inputted from the local beam input port 5 to a linearly polarized beam of a prescribed polarization direction (a direction parallel to the bottom surface 2c of the housing 2, for example).

The BS 12 branches the local beam $L_0$ outputted from the polarizer 11 into two beams. The branching ratio is 50 to 50. One of the branched local beams, $L_1$, travels straight through the BS 12 toward the MMI device 40. The other local beam $L_2$ has its optical axis converted by 90 degrees by the BS 12 and further reconverted by 90 degrees again by the reflector 13, and travels toward the MMI device 50.

The lens group 14 is disposed on the optical path between the BS 12 and the MMI device 40, and condenses the one local beam $L_1$ branched by the BS 12 to the local beam introduction port 41 of the MMI device 40. The lens group 15 is disposed on the optical path between the reflector 13 and the MMI device 50, and condenses the other local beam $L_2$ branched by the BS 12 and reflected by the reflector 13 to the local beam introduction port 51 of the MMI device 50. The lens groups 14 and 15 respectively include lenses 14b and 15b disposed relatively adjacent to the respective MMI devices 40 and 50, and include lenses 14a and 15a disposed relatively distant from the MMI devices 40 and 50. Through combining the lenses 14b, 15b and the lenses 14a, 15a to configure the condensing lenses, an optical coupling efficiency of the local beams $L_1$ and $L_2$ for the small local beam introduction ports 41 and 51 of the MMI devices 40 and 50 can be increased.

The skew adjustment element 16 is disposed on the optical path between the BS 12 and the lens group 14, and corrects a difference between optical path lengths of the two local beams $L_1$ and $L_2$ branched by the BS 12 from the BS 12 to each of the local beam introduction ports 41 and 51. That is, the optical path length of the local beam $L_2$ is longer than the optical path length of the local beam $L_1$ for the length of the optical path from the BS 12 to the reflector 13. The skew adjustment element 16 compensates the optical path length, that is, a time difference between the local beams $L_1$ and $L_2$ to each of the local beam introduction ports 41 and 51. The skew adjustment element 16 is made of silicon, and also is formed with a substantially transparent material for the wavelengths of the local beams $L_1$ and $L_2$, exhibiting about 99% transmittance for the local beams $L_1$ and $L_2$.

The signal beam optical system includes a polarization beam splitter (PBS) 21, a reflector 22, two lens groups 23, 24, a half-wavelength ($\lambda/2$) plate 25, and a skew adjustment element 26. The skew adjustment element 26 may be omitted if unnecessary.

The PBS 21 is optically coupled to the signal beam input port 6, and branches two polarization components of the signal beam $N_0$ provided from the single-mode fiber 36 via the signal beam input port 6. The branching ratio is 50 to 50, for example. The signal beam $N_0$ provided by the single-mode fiber 36 includes the two polarization components having polarization directions orthogonal to each other. The PBS 21 separates the two polarization components of the signal beam $N_0$ from each other. For example, out of the signal beam $N_0$, the PBS 21 transmits the polarization component parallel to the bottom surface 2c of the housing 2 to be the signal beam $N_1$, and reflects the polarization component perpendicular to the bottom surface 2c to be the signal beam $N_2$.

The signal beam $N_1$ transmitted through the PBS 21 is optically coupled to the signal beam introduction port 52 of the MMI device 50 by the lens group 23 after transmitting through the skew adjustment element 26. The skew adjustment element 26 is disposed on the optical path between the PBS 21 and the lens group 23, and corrects a difference between optical path lengths of the two signal beams $N_1$ and $N_2$ branched by the PBS 21 from the PBS 21 to each of the signal beam introduction ports 42 and 52. That is, the optical path length of the signal beam $N_2$ is longer than the optical path length of the signal beam $N_1$ for the length of the optical path from the PBS 21 to the reflector 22. The skew adjustment element 26 compensates the optical path length, that is, a time difference between the signal beams $N_1$ and $N_2$ to each of the signal beam introduction ports 42 and 52. The skew adjustment element 26 is formed with a material similar to that of the skew adjustment element 16.

The polarization direction of the other signal beam $N_2$ reflected by the PBS 21 is rotated by 90 degrees while passing through the $\lambda/2$ plate 25. Polarizations of the signal beams $N_1$ and $N_2$ immediately after being branched are orthogonal to each other. Through having the signal beam $N_2$ pass through the $\lambda/2$ plate 25, the polarization direction of the signal beam $N_2$ is rotated by 90 degrees to be the same as that of the other signal beam $N_1$. Then, the optical axis of the signal beam $N_2$ is converted by 90 degrees by the reflector 22, and optically coupled to the signal beam introduction port 42 of the MMI device 40 via the lens group 24.

The lens group 23 is disposed on the optical path between the PBS 21 and the MMI device 50, and condenses the one signal beam $N_1$ branched by the PBS 21 to the signal beam introduction port 52 of the MMI device 50. The lens group 24 is disposed on the optical path between the reflector 22 and the MMI device 40, and condenses the other signal beam $N_2$ branched by the PBS 21 and reflected by the reflector 22 to the signal beam introduction port 42 of the MMI device 40. The lens groups 23 and 24 respectively include lenses 23b and 24b disposed relatively adjacent to the respective MMI devices 50 and 40, and include lenses 23a and 24a disposed relatively distant from the MMI devices 50 and 40. Through combining the lenses 23b, 24b and the lenses 23a, 24a to configure the condensing lenses, an optical coupling efficiency of the signal beams $N_1$ and $N_2$ for the small signal beam introduction ports 52 and 42 of the MMI devices 50 and 40 can be increased.

The MMI device 40 includes a multi-mode interference waveguide (MMI waveguide) and a photodiode (PD) optically coupled to the waveguide. The MMI waveguide is a waveguide formed on an InP substrate, for example, and has the local beam $L_1$ inputted to the local beam introduction port 41 interfere with the signal beam $N_2$ inputted to the signal beam introduction port 42 to separate and modulate the information included in the signal beam $N_2$ into a phase component matching the phase of the local beam $L_1$ and a phase component different by 90 degrees from the phase of the local beam $L_1$. That is, the MMI device 40 demodulates the two independent pieces of information for the signal beam $N_2$. Similarly, the MMI device 50 includes an MMI waveguide and a PD optically coupled to the waveguide. The MMI waveguide is a waveguide formed on an InP substrate, and has the local beam $L_2$ inputted to the local beam introduction port 51 interfere with the signal beam $N_1$ inputted to the signal beam introduction port 52 to demodulate two pieces of information independent from each other.

The housing 2 has a rear wall 2b opposite to the front wall 2a. The housing 2 includes a feed-through 61 provided continuously from two sidewalls connecting the front wall 2a and the rear wall 2b over the rear wall 2b. A plurality of signal output terminals 65 are provided on the feed-through 61 of the rear wall 2b, and four pieces of independent information demodulated by the MMI devices 40, 50 are guided to outside the coherent receiver 1 via those signal output terminals 65 after being signal-processed by the integrated circuits 43, 53. An amplifier is mounted on the integrated circuits 43 and 53. Other terminals 66 and 67 are provided to the two sidewalls. The terminals 66 and 67 provides DC or low-frequency signals such as signals for driving the MMI devices 40, 50 and signals for driving each of the optical components to the inside the housing 2. Each of the integrated circuits 43 and 53 is mounted on respective circuit boards 46 and 56 surrounding the MMI devices 40 and 50. A resistance element, a capacitance element, and also a DC/DC converter as necessary, are mounted on those circuit boards 46 and 56.

The coherent receiver 1 further includes variable optical attenuator (VOA) 31, a BS 32, and a monitor PD 33. The VOA 31 and the BS 32 are disposed on the optical path of the signal beam $N_0$ between the PBS 21 and the signal beam input port 6. The BS 32 separates a part of the signal beam $N_0$ inputted from the signal beam input port 6. The separated part of the signal beam $N_0$ is inputted to the monitor PD 33. The monitor PD 33 generates an electric signal according to the intensity of the part of the signal beam $N_0$.

The VOA 31 attenuates the signal beam $N_0$ passed through the BS 32 as necessary. The attenuation degree is controlled by electric signals from the outside of the coherent receiver 1. For example, when an over-input state is detected based on the electric signals from the monitor PD 33 described above, the attenuation degree of the VOA 31 is increased to lower the intensity of the signal beams $N_1$ and $N_2$ traveling toward the MMI devices 40 and 50. The BS 32, the VOA 31, and the monitor PD 33 are fixed on a VOA carrier 30 mounted on the bottom surface 2c of the housing 2. The VOA carrier 30 has those optical components mounted on two upper and lower surfaces forming a step. Specifically, the BS 32 and the monitor PD 33 are mounted on one of the surfaces, and the VOA 31 is mounted on the other surface.

Figure 3:
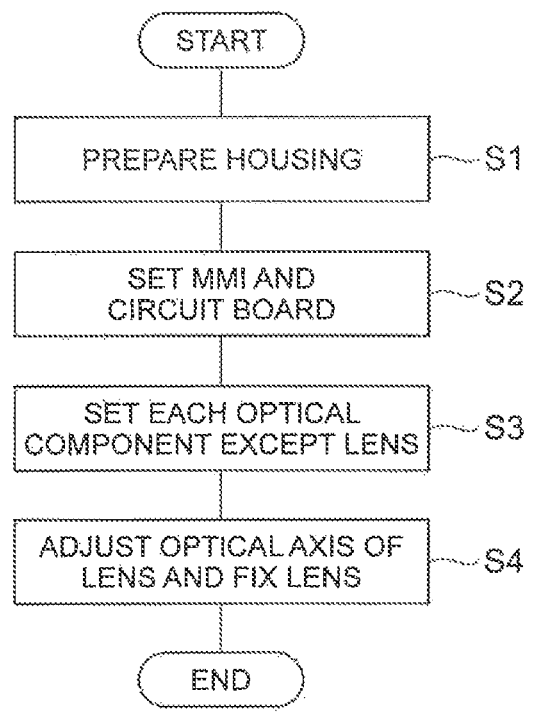
FIG. 3 is a flowchart illustrating each step when fabricating the coherent receiver.

A method for fabricating the coherent receiver 1 according to the embodiment will be described. FIG. 3 is a flowchart illustrating each step when assembling the coherent receiver 1. First, the housing 2 including the feedthrough 61 is prepared (step S1). Then, the MMI devices 40, 50 and the circuit boards 46, 56 where the integrated circuits 43, 53 are mounted are disposed at prescribed positions on the bottom surface 2c of the housing 2 (step S2). Subsequently, the polarizer 11, the BS 12, the reflector 13, the skew adjustment element 16, the PBS 21, the reflector 22, the λ/2 plate 25, the skew adjustment element 26, and the BS 32 are disposed at prescribed positions on the bottom surface 2c of the housing 2, and fixed by a resin adhesive or the like (step S3).

Figure 4:
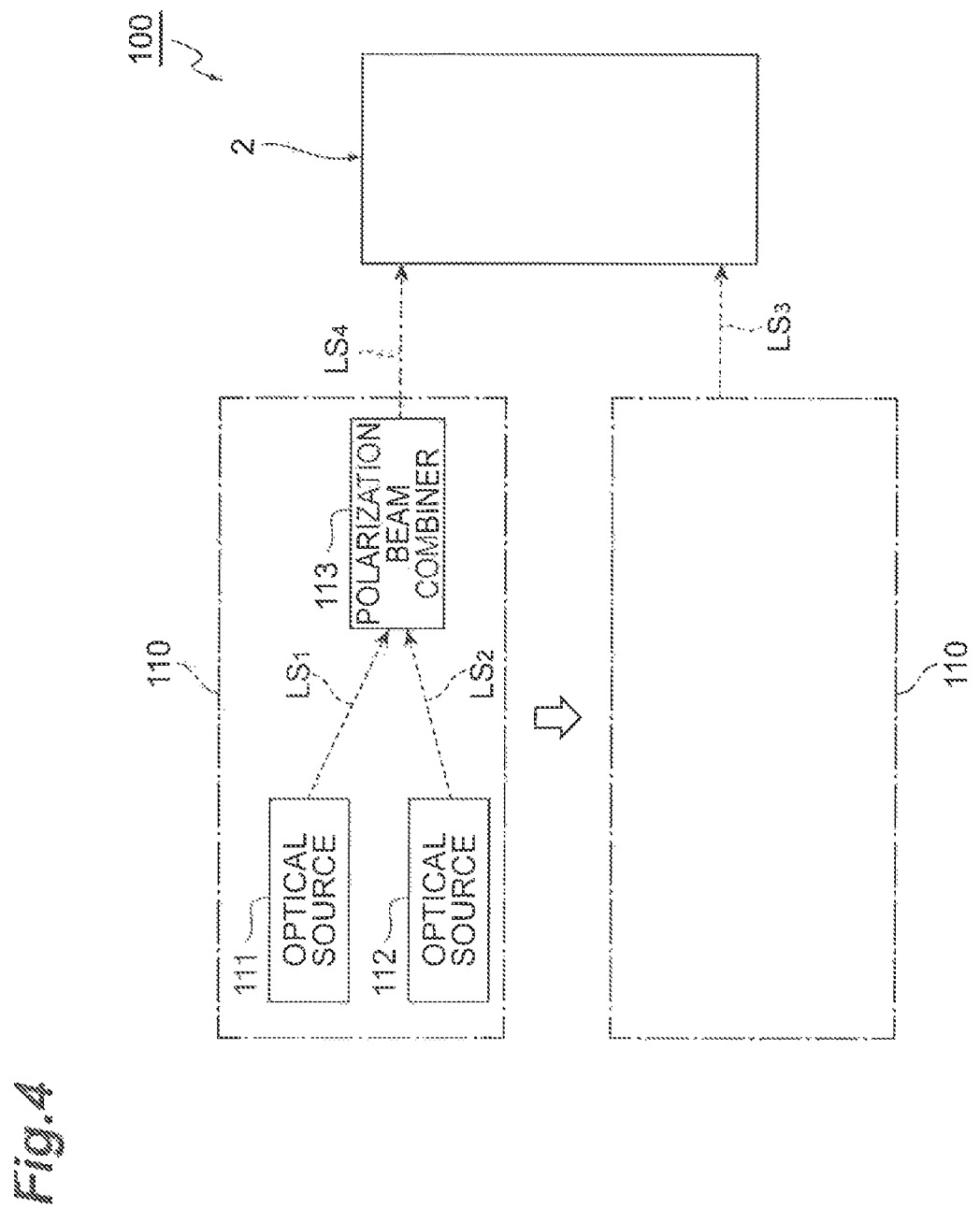
FIG. 4 is a diagram illustrating an example of a configuration of an adjusting device used when disposing lens groups.

Subsequently, the lens groups 14, 15 and the lens groups 23 and 24 are disposed at prescribed positions on the bottom surface 2c (on the base 4). FIG. 4 is a diagram illustrating an example of a configuration of an adjusting device 100 used when disposing the lens groups 14, 15, 23, and 24. As illustrated in FIG. 4, the adjusting device 100 includes a first reference optical source 110. The first reference optical source 110 combines a first beam $LS_1$ and a second beam $LS_2$ having polarization directions orthogonal to each other to generate a reference beam $LS_4$. In this example, the first reference optical source 110 is configured with an optical source 111 outputting the first beam $LS_1$, an optical source 112 outputting the second beam $LS_2$, and a polarization beam combiner 113. An output terminal of the polarization beam combiner 113 is optically coupled to a designated setting area of the signal beam input port 6 via the polarization maintaining fiber. FIG. 5 is a diagram for describing the first reference optical source 110 in detail. The optical source 111 outputs the first beam $LS_1$ of linear polarization. The optical source 112 outputs the second beam $LS_2$ of linear polarization. The optical sources 111 and 112 can be semiconductor lasers, for example, and the polarization directions of those may be the same with each other (slow-axis direction). The optical sources 111 and 112 are optically coupled to two input terminals of the polarization beam combiner 113 via the polarization maintaining fiber. The polarization maintaining fiber and the polarization beam combiner 113 are connected such that the polarization direction of the first beam $LS_1$ and the polarization direction of the second beam $LS_2$ become orthogonal to each other at the time of input to the polarization beam combiner 113. As a result, the reference beam $LS_4$ outputted from the polarization beam combiner 113 comes to have circularly polarized light. The reference beam $LS_4$ is inputted to the designated set area of the signal beam input port 6 via the single-mode fiber 36.

Figure 6A:
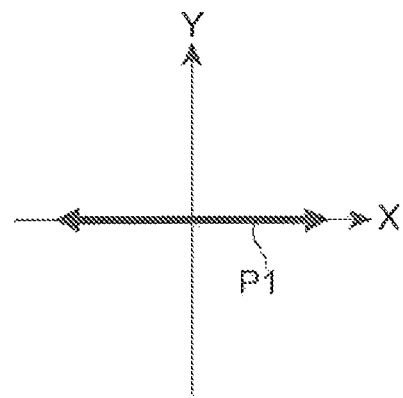
FIG. 6A is a chart illustrating a polarization state of a first beam $LS_1$ when inputted to a polarization beam combiner.
Figure 6B:
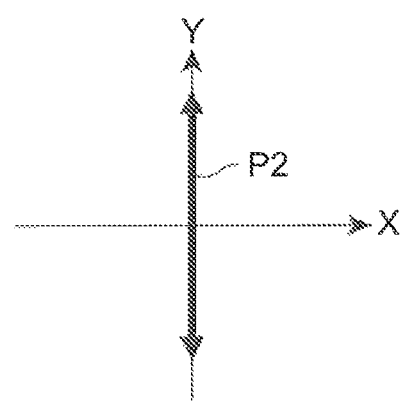
FIG. 6B is a chart illustrating a polarization state of a second beam $LS_2$ when inputted to the polarization beam combiner.
Figure 6C:
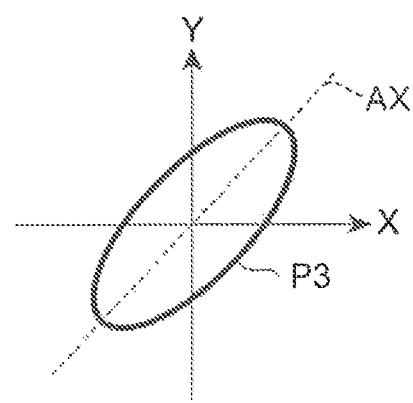
FIG. 6C is a chart illustrating a polarization state of a reference beam $LS_4$ when outputted from the polarization beam combiner.

FIG. 6A illustrates the polarization state of the first beam $LS_1$ when inputted to the polarization beam combiner 113, FIG. 6B illustrates the polarization state of the second beam $LS_2$ when inputted to the polarization beam combiner 113, and FIG. 6C illustrates the polarization state of the reference beam $LS_4$ when outputted from the polarization beam combiner 113. In those charts, X-axis and Y-axis orthogonal to the optical axis are defined. As illustrated in FIG. 6A, a polarization direction P1 of the first beam $LS_1$ when inputted to the polarization beam combiner 113 is defined to be parallel to the X-axis. In this case, as illustrated in FIG. 6B, a polarization direction P2 of the second beam $LS_2$ when inputted to the polarization beam combiner 113 is parallel to the Y-axis. Further, as illustrated in FIG. 6C, the reference beam $LS_4$ outputted from the polarization beam combiner 113 is an elliptically polarized beam P3 having an axis AX tilted by 45 degrees with respect to the X-axis and the Y-axis as the major axis (circularly polarized beam when the light intensity of the first beam $LS_1$ and the light intensity of the second beam $LS_2$ are equal to each other).

Referring back to FIG. 4, the first reference optical source 110 also functions as the optical source for generating a reference beam $LS_3$ of linear polarization. After the work described above, the first reference optical source 110 is optically coupled to the designated set area of the local beam input port 5 via the optical fiber, for example. The first reference optical source 110 is capable of inputting the reference beam to both of the input ports 5 and 6 by moving the output terminal.

In step S4, the axes of the lens groups 14, 15, 23, and 24 are adjusted by using the reference beam $LS_3$ and the reference beam $LS_4$. In step S4, positions and angles of the lens groups 14, 15, 23, and 24 are adjusted by using the reference beams $LS_3$ and $LS_4$. Specifically, the reference beam $LS_3$ is introduced to the designated set area of the local beam input port 5 of the coherent receiver 1 being assembled. The reference beam $LS_3$ is branched into two beams by the BS 12, and one of the beams is inputted to the local beam introduction port 41 of the MMI device 40 while the other beam is inputted to the local beam introduction port 51 of the MMI device 50. Then, the lens group 14 (lenses 14a and 14b) is placed on the optical path of one of the beams. Specifically, the lens 14a is placed and then fixed by a resin adhesive or the like after adjusting the position and the angle of the lens 14a such that the size of the electric signal becomes the maximum while measuring the size of the electric signal outputted from the photodiode built-in in the MMI device 40 (that is, the size of the electric signal outputted from the integrated circuit 43). The lens 14b is placed between the lens 14a and the local beam introduction port 41, and then fixed by a resin adhesive or the like after adjusting the position and the angle of the lens 14b such that the size of the electric signal becomes the maximum. Almost simultaneously, the lens group 15 (lenses 15a and 15b) is placed on the optical path of the other beam of the two beams branched by the BS 12. The process of placing the lenses 15a and 15b is similar to that of the lenses 14a and 14b.

Subsequently, the reference beam $LS_4$ is introduced to the designated set area of the signal beam input port 6 of the coherent receiver 1 being assembled. The reference beam $LS_4$ is branched into two by the PBS 21, and one of the beams is inputted to the signal beam introduction port 42 of the MMI device 40 while the other beam is inputted to the signal beam introduction port 52 of the MMI device 50. Then, the lens group 24 (lenses 24a and 24b) is placed on the optical path of the one of the beams. Specifically, the lens 24a is placed and then fixed by a resin adhesive or the like after adjusting the position and the angle of the lens 24a such that the size of the electric signal becomes the maximum while measuring the size of the electric signal outputted from the photodiode built-in in the MMI device 40 (that is, the size of the electric signal outputted from the integrated circuit 43). Then, the lens 24b is placed between the lens 24a and the signal beam introduction port 42, and then fixed by a resin adhesive or the like after adjusting the position and the angle of the lens 24b such that the size of the electric signal becomes the maximum. Almost simultaneously, the lens group 23 (lenses 23a and 23b) is placed on the optical path of the other beam of the two beams branched by the PBS 21. The process of placing the lenses 23a and 23b is similar to that of the lenses 14a and 14b. Then, the VOA 31 and the monitor PD 33 are disposed at prescribed positions on the bottom surface 2c of the housing 2, and fixed by a resin adhesive or the like.

Next, adjustment of the first reference optical source 110 will be described. This adjustment is performed at the time of maintenance or inspection of the coherent receiver 1, for example. FIG. 7 is a diagram for describing the reason why the adjustment of the first reference optical source 110 is performed. As described above, the first beam $LS_1$ and the second beam $LS_2$ when inputted to the polarization beam combiner 113 are combined such that the polarization directions P1 and P2 thereof become orthogonal to each other. However, the relative angle of the polarization directions P1 and P2 of the reference beam $LS_4$ may become shifted from 90 degrees due to a relative angle error generated when combining the two beams $LS_1$ and $LS_2$. Note here that the relative angle error when combining the beams $LS_1$ and $LS_2$ includes specifically a polarization angle error (typically ±3 degrees) of the optical sources 111, 112, an attachment error of the optical connector interposed between the optical sources 111, 112 and the beam combiner 113, and an error inside the polarization beam combiner 113 (shift of a refractive index).

When the polarization beam combiner 113 is connected to the single-mode fiber 36 via a single or a plurality of optical connectors such as optical connectors 114 and 115, the tilt angle of the major axis AX (refer to FIG. 6C) of the elliptically polarized beam of the reference beam $LS_4$ with respect to the X-axis and the Y-axis may slightly fluctuate due to the attachment error of those optical connectors 114 and 115. When the type of the optical connector attached to the end of the polarization maintaining fiber extended out from the polarization beam combiner 113 and the type of the optical connector attached to the end of the single-mode fiber 36 are different, it is necessary to attach another polarization maintaining fiber between those. In such case, for example, the optical connectors 114 and 115 are to be interposed between the polarization beam combiner 113 and the single-mode fiber 36. Such phenomenon may be a cause for generating an intensity difference between the two polarization components generated by branching the reference beam $LS_4$ by the PBS 21. When the axes of the lens groups 23 and 24 are aligned by using such polarization components, the accuracy of the positions and angles of the lens groups 23 and 24 becomes different from each other between the signal beam $N_1$ and the signal beam $N_2$ so that the reception accuracy may vary for each polarization component.

Figure 8A:
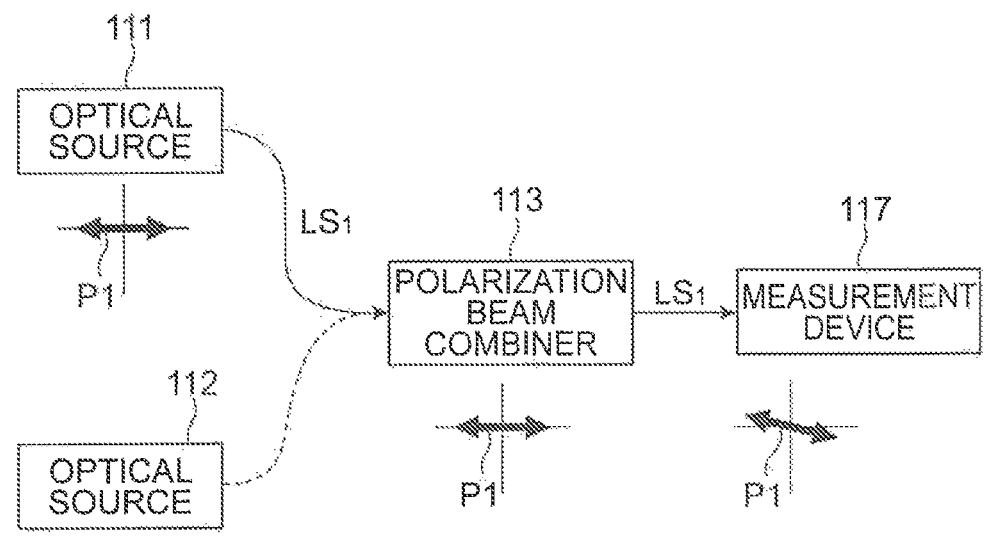
FIG. 8A and FIG. 8B are diagrams for describing an example for solving issues.
Figure 8B:
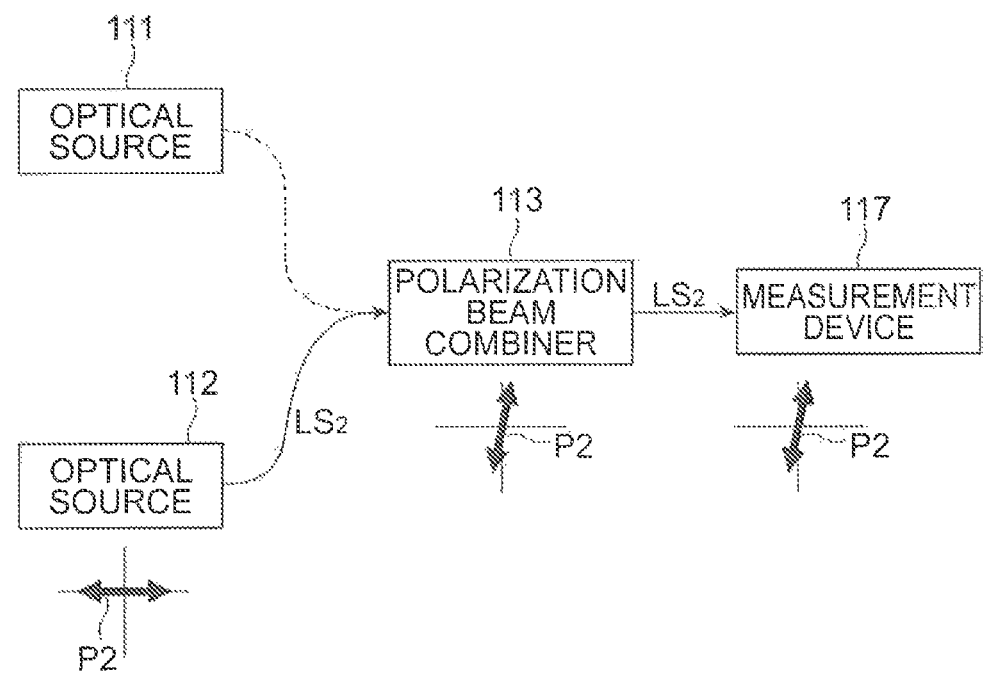

FIG. 8A and FIG. 8B are diagrams for describing an example for solving the issues described above. In this example, a beam is outputted only from the optical source 111, while output of a beam from the optical source 112 is stopped. Then, while measuring the polarization state of the first beam $LS_1$ outputted from the polarization beam combiner 113 by a measurement device 117, the optical source 111 is adjusted such that the polarization direction P1 of the first beam $LS_1$ becomes closer to the X-axis. Then, light is outputted only from the optical source 112, while stopping output of light from the optical source 111. Then, while measuring the polarization state of the second beam $LS_2$ outputted from the polarization beam combiner 113 by the measurement device 117, the optical source 112 is adjusted such that the polarization direction P2 of the second beam $LS_2$ becomes closer to the Y-axis.

Figure 9:
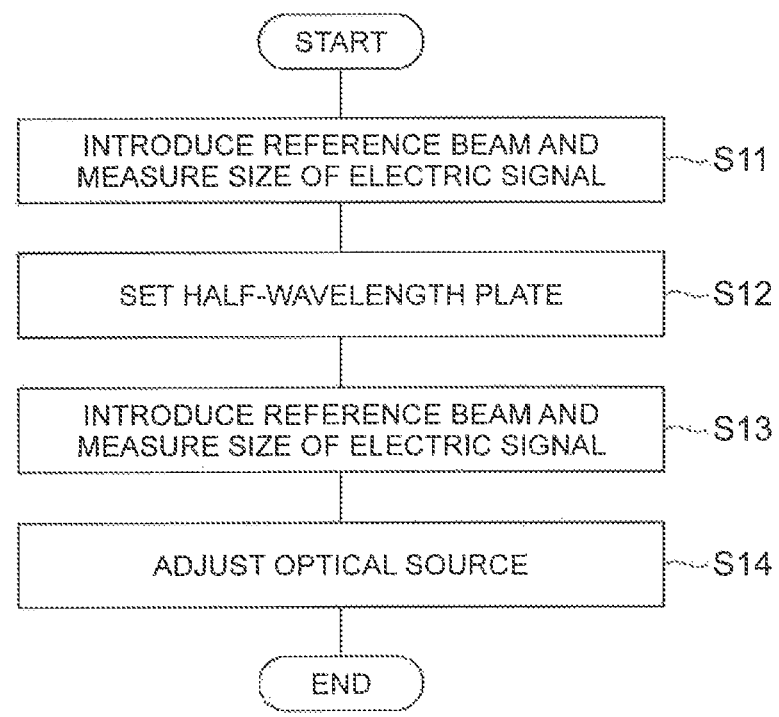
FIG. 9 is a flowchart illustrating a method for adjusting the first reference optical source.

However, when a single or a plurality of optical connectors such as the optical connectors 114 and 115 exist between the polarization beam combiner 113 and the signal beam input port 6 as illustrated in FIG. 7, it is difficult with the method illustrated in FIG. 8A and FIG. 8B to decrease shift of the polarization angle caused by the attachment error of those optical connectors. In the embodiment, shift of the polarization angle of the reference beam $LS_4$ is decreased by adjusting the first reference optical source 110 by a following method. FIG. 9 is a flowchart illustrating the method for adjusting the first reference optical source 110 according to the embodiment in detail.

The reference beam $LS_4$ is introduced to the signal beam input port 6. The introduced reference beam $LS_4$ reaches the PBS 21 via the BS 32 and the VOA 31. The reference beam $LS_4$ is branched by the PBS 21 into two polarization components having polarization directions orthogonal to each other. One of the polarization components reaches the MMI device 50 via the skew adjustment element 26 and the lens group 23. The other polarization component reaches the MMI device 40 via the reflector 22, the λ/2 plate 25, and the lens group 24. In this step, the size of the electric signals generated in the MMI device 50 (or 40) is measured (step S11). The size of the electric signal is defined as the first size.

Figure 10:
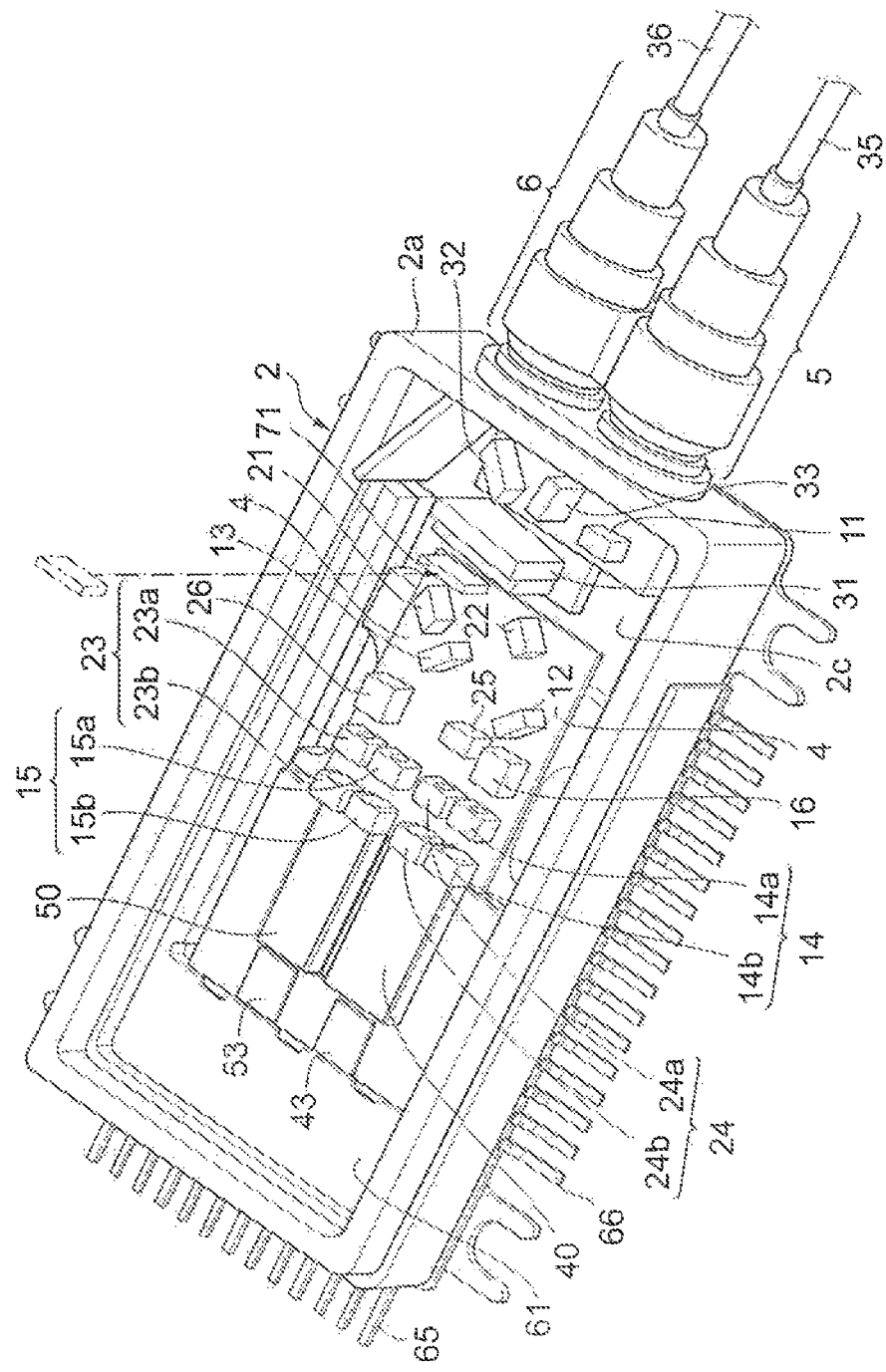
FIG. 10 is a perspective view illustrating a step of disposing a $\lambda/2$ plate on an optical path between a signal beam input port and a PBS.

Next, as illustrated in FIG. 10, a half-wavelength plate (λ/2) 71 is disposed on the optical path between the signal beam input port 6 and the PBS 21 (between the VOA 31 and the PBS 21 in the embodiment) (step S12). Such component is not limited to the λ/2 plate 71, as long as it is a polarization rotation component for rotating the polarization angle of the reference beam $LS_4$ by 90 degrees.

The mechanism of rotating the polarization angle by 90 degrees by the half-wavelength plate 71 is as follows. In general, the half-wavelength plate rotates the phase of the passing light by 180 degrees (that is, for the half-wavelength). With this effect, the polarization angle of the linearly polarized beam making incident on the optical axis of the half-wavelength plate is doubled when emitted from the half-wavelength plate. The polarization angle when making incident can be set as desired through rotating the half-wavelength plate. In the embodiment, the optical axis of the half-wavelength plate 71 is disposed at an angle of 45 degrees with respect to the horizontal plane. Accordingly, when the polarization angle at the time of making incident is 0 degree, the polarization angle at the time of emission becomes by 90 degrees.

The reference beam $LS_4$ is introduced again to the signal beam input port 6. The introduced reference beam $LS_4$ with its polarization direction rotated by 90 degrees by the λ/2 plate 71 reaches the PBS 21. The reference beam $LS_4$ is branched by the PBS 21 into two polarization components having polarization directions orthogonal to each other. One of the polarization components, that is, the polarization component inputted to the MMI device 50 in step S11 is inputted to the MMI device 40 in this step. The other polarization component, that is, the polarization component inputted to the MMI device 40 in step S11 is inputted to the MMI device 50 in this step. Then, the size of the electric signal is measured again in the same MMI device 50 (or 40)

as the MMI device whose size of the electric signal is measured in step S11 (step S13). The size of the electric signal is defined as the second size.

Then, at least one of the light intensity and the polarization direction of at least one of the first beam $LS_1$ and the second beam $LS_2$ is adjusted such that the first size and the second size of the electric signals measured in steps S11 and S13 become closer to each other (step S14). This adjustment is performed for the optical sources 111 and 112. After step S14, the half-wavelength plate 71 is removed. Through the steps described above, adjustment of the first reference optical source 110 is completed and the intensity difference between the two beams outputted from the PBS 21 can be decreased.

For the adjustment of the first reference optical source 110, used is the coherent receiver 1 where adjustment of the optical axes of the lens group 23 is completed. Alternatively, an adjustment tool having a similar inside configuration as that of the coherent receiver 1 may be used instead of the coherent receiver 1.

The effects acquired by the assembling method and the optical source adjustment method according to the embodiment described above are as follows. The assembling method according to the embodiment includes step S4 where the lens groups 23 and 24 are placed on the optical path of the branched beams of the reference beam $LS_4$ while introducing the reference beam $LS_4$ acquired by combining the first beam $LS_1$ and the second beam $LS_2$ having the polarization directions orthogonal to each other to the signal beam input port 6 of the coherent receiver 1 and measuring the size of the electric signals outputted from each of the MMI devices 40 and 50. Therefore, it is unnecessary to adjust the polarization direction of the reference beam every time the lens groups 23 and 24 are disposed, so that assembling of the lens groups 23 and 24 can be performed easily by decreasing complication of the assembling work.

Further, the optical source adjustment method according to the embodiment performs adjustment of the first reference optical source 110 generating the reference beam $LS_4$. As described above, when adjusting the optical source, the reference beam is introduced to the signal beam input port 6 and the first size of the electric signal generated in the MMI device 50 (or 40) is measured. At this time, one of the polarization components branched by the PBS 21 reaches the MMI device 50 (or 40). Then, the λ/2 plate 71 (or a polarization rotation component for rotating the polarization angle by 90 degrees) is disposed on the optical path between the signal beam input port 6 and the PBS 21. Thereby, the polarization direction of the reference beam $LS_4$ is rotated roughly by 90 degrees, so that the other polarization component orthogonal to the one polarization component reaches the MMI device 50 (or 40) instead of the one polarization component. Then, the second size of the electric signal generated in the MMI device 50 (or 40) is measured. At least one of the first beam $LS_1$ and the second beam $LS_2$ is adjusted such that the first size and the second size of the electric signals become closer to each other. This makes it possible to extremely decrease the intensity difference between each of the polarization components generated by branching the reference beam $LS_4$ by the PBS 21, so that assembling of the lens groups 23 and 24 can be done with fine accuracy.

In steps S11 and S13, the electric signal outputted from the one (the MMI device 50 in the embodiment) on the extended line of the optical axis of the signal beam input port 6 out of the MMI devices 40 and 50 may be measured. A reflection-type optical component such as the reflector 22 is not disposed between the PBS 21 and the MMI 50. Therefore, it is possible to measure the size of each of the polarization components with fine accuracy by decreasing the causes for the errors.

The reference beam adjustment method according to the present disclosure is not limited to the embodiments described above but various modifications are possible. For example, the lens groups 23 and 24 as the optical components placed by using the reference beam $LS_4$ are described as a way of example in the embodiment above. However, the optical components are not limited to the lens groups, and the present invention can be applied when placing various kinds of optical components disposed between the PBS 21 and the MMI devices 40, 50. Further, while the coherent receiver is described as an example of the optical receiver in the embodiment above, the present invention is not limited to that but can be applied to any optical receiver generating electric signals from each of the polarization components passed through the polarization beam splitter. Furthermore, while the first reference optical source 110 is adjusted before placing the lens groups 14, 15 in the embodiment above, the lens groups 14, 15 may be placed before adjusting the first reference optical source 110.

What is claimed is:

1. A method for adjusting an optical source used for fabricating an optical receiver that comprises a signal beam input port receiving a signal beam including two polarization components having polarization directions orthogonal to each other, a polarization beam splitter splitting the signal beam into the two polarization components, and two signal generation units generating electric signals based on each of the two polarization components passed through the polarization beam splitter, wherein the optical source generates a reference beam by combining a first beam and a second beam having polarization directions orthogonal to each other, the method comprising:
   introducing the reference beam to the signal beam input port and measuring a first size of an electric signal generated in one of the signal generation units;
   disposing a half-wavelength plate in an optical path between the polarization beam splitter and the one of the signal generation units;
   introducing the reference beam to the signal beam input port and measuring a second size of an electric signal generated in the one of the signal beam generation units after disposing the half-wavelength plate in the optical path; and
   adjusting at least one of the first beam and the second beam such that the first size and the second size become close to each other.

2. A method for adjusting an optical source used for fabricating an optical receiver that comprises a signal beam input port receiving a signal beam including two polarization components having polarization directions orthogonal to each other, a polarization beam splitter splitting the signal beam into the two polarization components, and two signal generation units generating electric signals based on each of the two polarization components passed through the polarization beam splitter, wherein the optical source generates a reference beam by combining a first beam and a second beam having polarization directions orthogonal to each other, the method comprising:
   introducing the reference beam to the signal beam input port and measuring a first size of an electric signal generated in one of the signal generation units;

disposing a polarization rotation component rotating a polarization angle by 90 degrees in an optical path between the signal beam input port and the polarization beam splitter;

introducing the reference beam to the signal beam input port and measuring a second size of an electric signal generated in the one of the signal beam generation units after disposing the polarization rotation component in the optical path; and adjusting at least one of the first beam and the second beam such that the first size and the second size become close to each other.

\* \* \* \* \*